United States Patent
Matsumoto et al.

[11] Patent Number: 6,091,791
[45] Date of Patent: Jul. 18, 2000

[54] SHROUD ATTACHMENT FOR A BOILING WATER REACTOR

[75] Inventors: Jack T. Matsumoto, Sunnyvale; Alex B. Fife, San Jose, both of Calif.

[73] Assignee: General Electric Company, Schenectady, N.Y.

[21] Appl. No.: 09/017,032

[22] Filed: Feb. 2, 1998

Related U.S. Application Data

[60] Provisional application No. 60/057,211, Aug. 29, 1997.

[51] Int. Cl.[7] ..................................................... G21C 9/00
[52] U.S. Cl. .......................... 376/287; 376/285; 376/302; 376/370; 376/372; 376/461
[58] Field of Search .................................... 376/285, 287, 376/302, 370, 372, 461

[56] References Cited

U.S. PATENT DOCUMENTS

| | | | |
|---|---|---|---|
| 3,508,774 | 4/1970 | Simonson | 287/189.36 |
| 4,138,030 | 2/1979 | Andersson | 220/3 |
| 4,240,561 | 12/1980 | Hagstrom et al. | 220/3 |
| 5,265,141 | 11/1993 | Kobsa | 376/446 |
| 5,519,744 | 5/1996 | Relf | 376/287 |
| 5,583,899 | 12/1996 | Relf | 376/287 |
| 5,659,590 | 8/1997 | Relf | 376/287 |
| 5,737,378 | 4/1998 | Ballas et al. | 376/287 |
| 5,862,936 | 1/1999 | Johanson | 220/304 |

*Primary Examiner*—Charles T. Jordan
*Assistant Examiner*—Jack Keith
*Attorney, Agent, or Firm*—Armstrong Teasdale LLP

[57] ABSTRACT

A shroud attachment assembly which provides both structural support for the shroud and a seal between the shroud and shroud support is described. In one specific embodiment, the shroud attachment assembly includes a shroud flange formed integral with the shroud, and a pump deck flange formed integral with the pump deck. The shroud flange extends over the pump deck flange, and a plurality of studs extend through aligned openings in the flanges. In addition, a plurality of wedges are secured to the shroud flange by studs, and the wedges extend between the shroud flange and the pump deck flange. Generally, the studs which extend through aligned openings in the shroud and pump deck flanges transfer vertical loads from the shroud to the pump deck, and the wedges transfer horizontal loads from the shroud to the pump deck.

12 Claims, 3 Drawing Sheets

SHROUD ATTACHMENT FOR A BOILING WATER REACTOR

CROSS REFERENCE TO RELATED APPLICATION

This application claims the benefit of U.S. Provisional Application No. 60/057,211, filed Aug. 29, 1997.

FIELD OF THE INVENTION

This invention relates generally to boiling water nuclear reactors and more particularly, to a shroud attachment for attaching a shroud to a shroud support in such a reactor.

BACKGROUND OF THE INVENTION

Boiling water nuclear reactors (BWRs) typically include a reactor core located within a reactor pressure vessel (RPV). A known RPV includes a substantially cylindrical shell. The shell, for example, can be about twenty feet in diameter and about seven inches thick. A substantially cylindrical core shroud is positioned within, and spaced from, the shell walls to restrain horizontal movement of the reactor core fuel bundles and provides flow separation between the downcomer and the upward core flow.

A bottom head knuckle, or junction, assembly forms an interface, or junction, between the cylindrical shell and a substantially disk shaped bottom head. Specifically, the bottom head knuckle assembly includes a shroud support subassembly and an annular forging having a top, cylindrical shaped end and a bottom, conical shaped end. The top, cylindrical shaped end of the forging is configured to be welded to one end of the RPV shell and the bottom, conical shaped end of the forging is configured to be welded to the disk shaped bottom head.

The shroud support subassembly includes a shroud support cylinder having an upper surface configured to be welded to the core shroud. An annular pump deck extends from an outer surface of the shroud support cylinder. Shroud support legs, if used, extend from the lower surface of the shroud support cylinder. The shroud support legs are welded to weld build-up pads formed on an inner surface of the annular forging.

The shroud in a BWR is a cylindrical, steel structure which surrounds the core of the reactor and, as explained above, provides a barrier to separate the upward flow of water through the core from the downward flow in the annulus between the shroud and the RPV. The shroud also provides support for the core by restraining the top guide grid and core plate which are considered as part of the core support structure.

The shroud support provides structural support for the shroud as well as provides a baffle between the annulus and the bottom of the shroud. Pumps penetrate the shroud support to create the downward flow from the annulus into the shroud/core.

Stress corrosion cracking has occurred in shrouds and other internal components of the BWRs. Preventative measures have and are being implemented to reduce the risk of cracking due to stress corrosion cracking. Due to the working environment (radiation, underwater) and the numerous welds, substantial effort is required to replace a shroud. For example, remote cutting, welding, and ultrasonic inspections are required in removing and replacing a shroud.

Some known BWRs have shrouds which are bolted in place and are designed to be removed. In addition, some known pressurized water reactors have a core barrel, which is similar to a shroud, supported in the pressure vessel by a bolted connection.

It would be desirable to provide a shroud which can be removed and replaced more easily than known shrouds. It also would be desirable to provide such a removable shroud which performs all the functions of the known shrouds.

SUMMARY OF THE INVENTION

These and other objects may be attained by a shroud attachment assembly which provides both structural support for the shroud and a seal between the shroud and shroud support. In one specific embodiment, the shroud attachment assembly includes a shroud flange formed integral with the shroud, and a pump deck flange formed integral with the pump deck. The shroud flange extends over the pump deck flange, and a plurality of studs extend through aligned openings in the flanges. In addition, a plurality of wedges are secured to the shroud flange by studs, and the wedges extend between the shroud flange and the pump deck flange. Generally, the studs which extend through aligned openings in the shroud and pump deck flanges transfer vertical loads from the shroud to the pump deck, and the wedges transfer horizontal loads from the shroud to the pump deck.

The above described shroud attachment assembly permits the remote removal and installation of the core shroud. In addition, the assembly provides a sufficient seal between the shroud and the shroud support, and transfers the load from the shroud to the shroud support. Specifically, vertical loads are transferred through the stud and nuts which are engaged to the shroud and pump deck flanges, and the horizontal shear loads are transferred through the wedges. The studs, nuts, and wedges may be remotely installed and removed. The wedges also enable adjustment and alignment of the shroud relative to the shroud support. Particularly, the wedges may be adjusted to move the shroud in a radial direction. With such assembly, removal of the shroud does not require cutting, and installation of the shroud does not require machining in the vessel.

DETAILED DESCRIPTION

Figure 1:
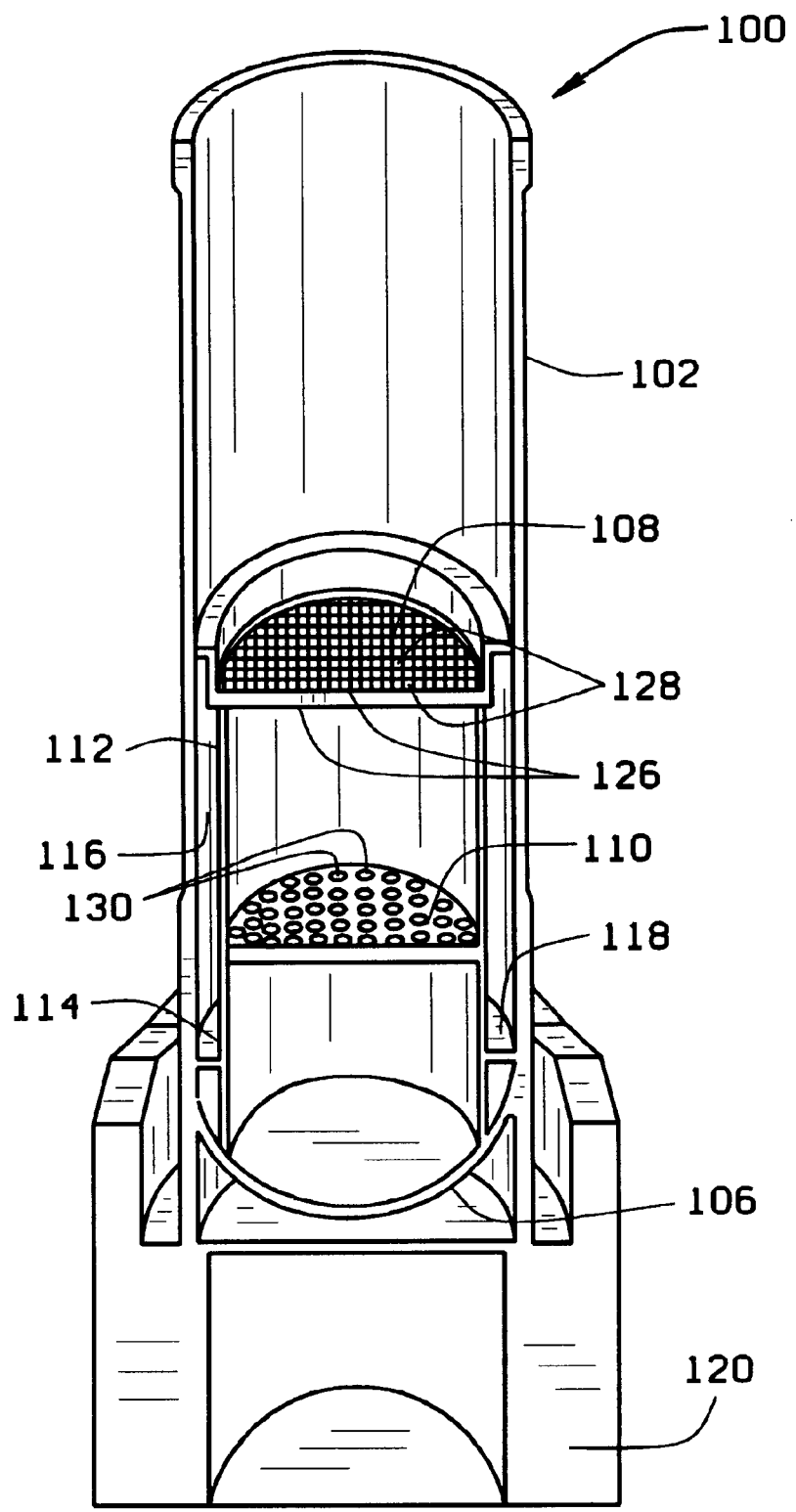
FIG. 1 is a schematic, partial cross section, illustration of a boiling water reactor.

FIG. 1 is a schematic, partial cross section, illustration of a boiling water reactor 100 including a reactor pressure vessel (RPV) 102. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102. RPV 102 is supported by an RPV support structure 120, and RPV 102 is, of course, filled with water.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported horizontally by core plate 110 and top guide beams 126. The fuel is supported vertically by structure not shown.

Figure 2:
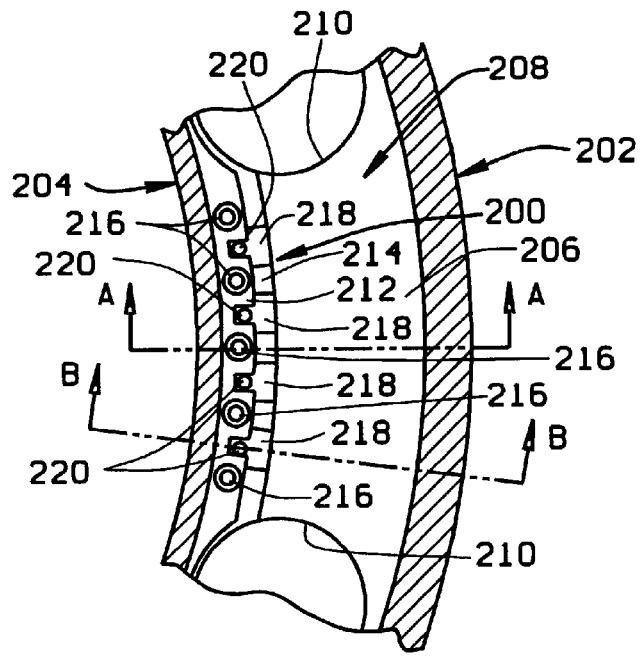
FIG. 2 is a top view of a portion of a shroud attachment assembly in accordance with one embodiment of the present invention.

FIG. 2 is a top view of a shroud attachment assembly 200 in accordance with one embodiment of the present invention. A portion of an RPV 202 and a shroud 204 also are shown in FIG. 2. A baffle plate, or pump deck, 206 extends across an annulus 208 between RPV 202 and shroud 204, and pump deck 206 has a plurality of openings 210 therein. Pumps (not shown) may penetrate through openings 210 to create the downward flow from annulus 208 into shroud 204.

As shown in FIG. 2, shroud 204 includes a shroud flange 212 and pump deck 206 includes a pump deck flange 214. Shroud flange 212 extends over pump deck flange 214, and a plurality of studs 216 extend through flanges 212 and 214. In addition, a plurality of wedges 218 are secured to shroud flange 212 by studs 220, and wedges 218 extend between shroud flange 212 and pump deck flange 214. Wedges may be fabricated, for example, from stainless steel. Generally, and as explained below in more detail, studs 216 transfer vertical loads from shroud 204 to pump deck 206, and wedges 218 transfer horizontal loads from shroud 204 to pump deck 206. As explained above, pump deck 206 forms part of the shroud support structure.

Figure 3:
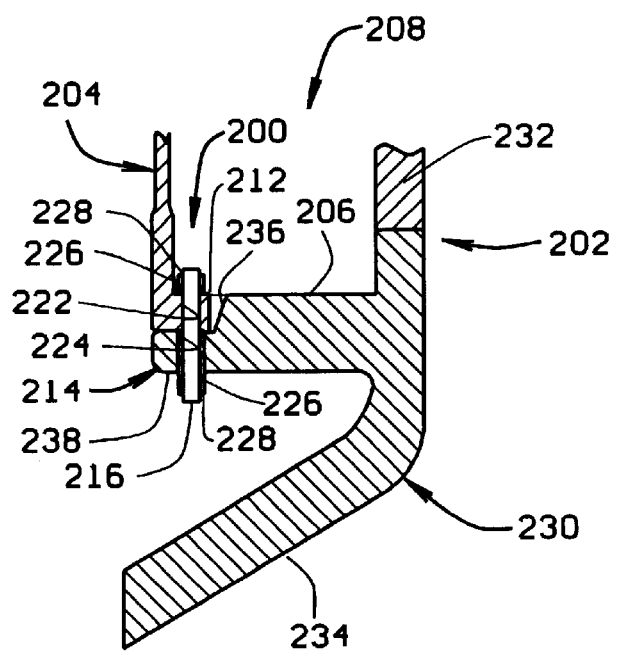
FIG. 3 is a cross sectional view of the shroud attachment assembly through line A—A shown in FIG. 2.

FIG. 3 is a cross sectional view of shroud attachment assembly 200 through line A—A shown in FIG. 2. As shown in FIG. 3, stud 220 extends through aligned openings 222 and 224 in shroud flange 212 and pump deck flange 214. Nuts and keepers 226 and 228 are tightened against respective flanges 212 and 214.

Still referring to FIG. 3, a bottom head knuckle, or junction, assembly 230 forms an interface, or junction, between a cylindrical shell 232 and a substantially disk shaped bottom head 234 of RPV 202. Pump deck 206 is integral with bottom head 234 and extends inward toward shroud 204. Openings 222 and 224 are oversized to allow adjustment of shroud 204 in a radial direction. Studs 220 are tensioned during assembly to provide the necessary preload.

The size of flanges 212 and 214 are selected to provide adequate stiffness and strength. In FIG. 3, flange 214 is shown as including a transition portion 236 and contact portion 238 which has a smaller thickness than the thickness of the other portions pump deck 206. Shroud flange 212 rests on contact portion 238 of flange 214. Of course, the specific configuration of each flange 212 and 214 may vary from the configuration shown depending upon the required stiffness and strength.

Figure 4:
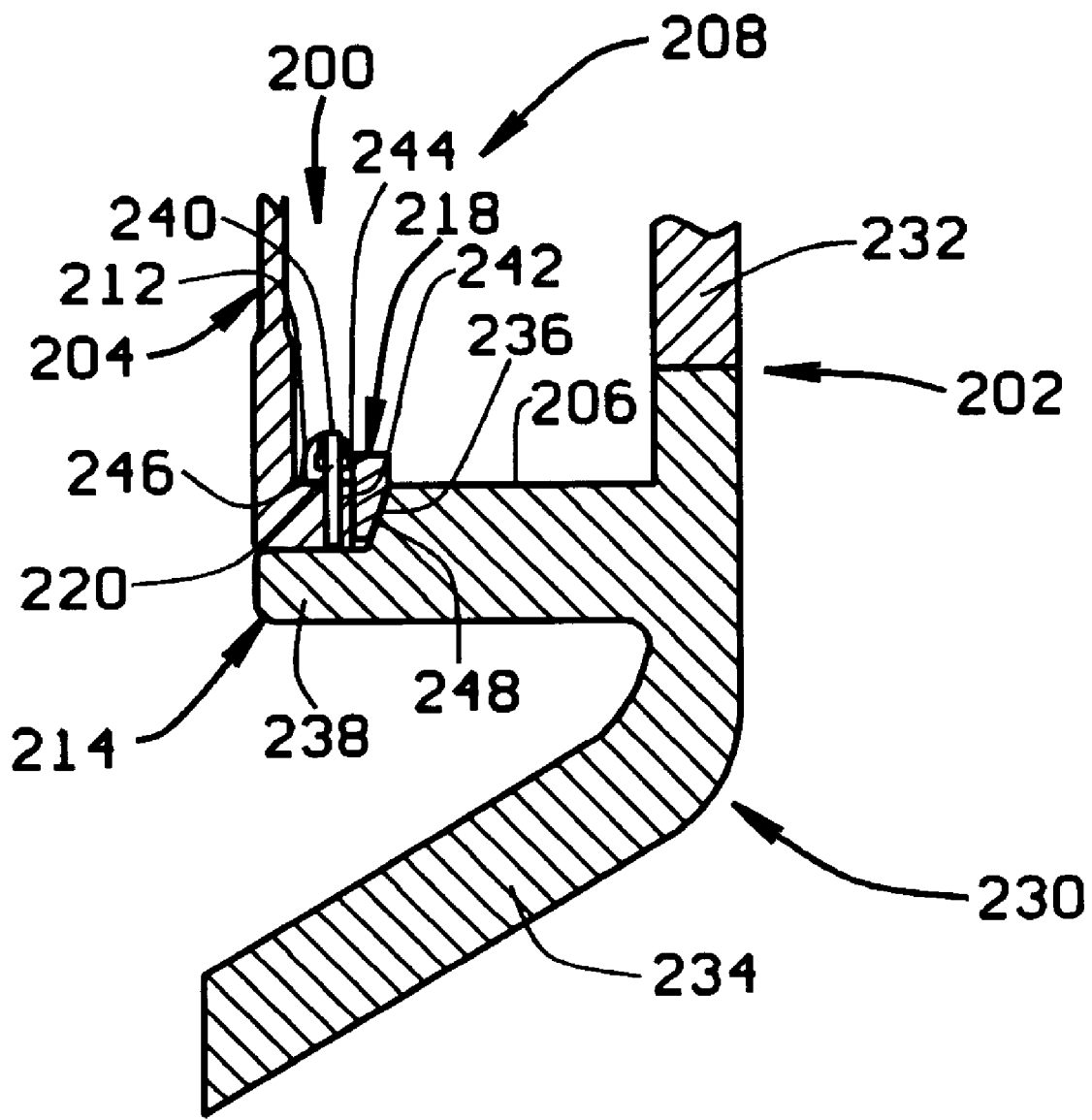
FIG. 4 is a cross sectional view of the shroud attachment assembly through line B—B shown in FIG. 2.

FIG. 4 is a cross sectional view of shroud attachment assembly 200 through line B—B shown in FIG. 2. As shown in FIG. 4, wedge 218 is positioned between shroud flange 218 and transition portion 236 of pump deck flange 214 which extends radically from an inner circumference of the pump deck 206. Stud 220 is threadedly secured to shroud flange 212 and a threaded end 240 of stud 220 extends through an opening 242 in an arm 244 of wedge 218. A nut 246 is threadedly engaged to end 240 of stud 220 and is tightened against arm 244 of wedge 218. An angled surface 248 of wedge 218 contacts a surface of transition portion 236.

Wedges 218 transfer horizontal loads from shroud 204 to pump deck 206. Wedges 218 also prevent shear loads from being transferred to studs 216 which resist the vertical loads. The angle of wedge surface 248 is selected so that friction is sufficient to keep wedge 218 in place, and no vertical load is required. Studs 220 and nuts 246 are used to retain wedges 218 to resist vibration or flow loads which might cause wedges 218 to be displaced.

The bottom surface of shroud flange 212 and the mating, or top, surface of contact portion 238 of pump deck flange 214 are machined to minimize flow leakage. Such machining is performed to provide sufficient resistance at the interface between flanges 212 and 214 to minimize by pass flow from shroud 204 into annulus 208.

The above described shroud attachment assembly permits the remote removal and installation of the core shroud. In addition, the assembly provides a sufficient seal between the shroud and the shroud support, and transfers the load from the shroud to the shroud support. Specifically, vertical loads are transferred through the stud and nuts which are engaged to the shroud and pump deck flanges, and the horizontal shear loads are transferred through the wedges. The studs, nuts, and wedges may be remotely installed and removed. The wedges also enable adjustment and alignment of the shroud relative to the shroud support. Particularly, the wedges may be adjusted to move the shroud in a radial direction. With such assembly, removal of the shroud does not require cutting, and installation of the shroud does not require machining in the vessel.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A shroud attachment assembly comprising:

a shroud comprising a flange;

a shroud support structure comprising a pump deck having a flange, said shroud flange and said pump deck flange having a plurality of openings therein, said shroud flange openings and said pump deck openings configured to align;

a first threaded stud extending through said aligned openings in said shroud and said pump deck flanges;

first and second nuts threadedly engaged to respective ends of said first threaded stud, said first nut tightened against said shroud flange and said second nut tightened against said pump deck flanges;

a second threaded stud secured to said shroud flange; and a wedge secured to said second stud.

2. A shroud attachment assembly in accordance with claim 1 wherein said wedge extends between the shroud flange and the pump deck flange.

3. A shroud attachment assembly in accordance with claim 2 wherein the pump deck flange includes a transition portion, and said wedge comprises an angled surface configured to be in contact with the transition portion.

4. A shroud assembly in accordance with claim 1 wherein said pump deck flange extends radially from an inner circumference of said pump deck.

5. A nuclear reactor comprising:

a shroud comprising a shroud flange having a plurality of openings therein;

a shroud support structure comprising a pump deck having a flange with a plurality of openings therein, said shroud flange positioned over said pump deck flange, and openings in said shroud flange aligned with openings in said pump deck flange;

a plurality of first threaded studs extending through said aligned openings in said shroud flange and said pump deck flange;

a plurality of second threaded studs secured to and extending from said shroud flange; and a plurality of wedges secured to respective studs extending from said shroud flange.

6. A nuclear reactor in accordance with claim 5 further comprising first and second nuts threadedly engaged to respective ends of each of said threaded studs, each of said first nuts tightened against said shroud flange and each of said second nuts tightened against said pump deck flange.

7. A nuclear reactor in accordance with claim 5 wherein each of said wedges extends between said shroud flange and said pump deck flange.

8. A nuclear reactor in accordance with claim 7 wherein said pump deck flange includes a transition portion, and each of said wedges comprises an angled surface configured to be in contact with said transition portion.

9. A nuclear reactor in accordance with claim 5 further comprising a bottom head, said pump deck integral with said bottom head.

10. A nuclear reactor in accordance with claim 5 further comprising a reactor pressure vessel, an annulus between said shroud and said reactor pressure vessel, said pump deck extending across said annulus.

11. A nuclear reactor in accordance with claim 10 wherein a bottom surface of said shroud flange and a top surface of said pump deck flange form a seal to provide resistance to flow from said shroud into said annulus.

12. A nuclear reactor in accordance with claim 5 wherein said pump deck flange extends radially from an inner circumference of said pump deck.

* * * * *